United States Patent
Walters

(10) Patent No.: US 9,877,488 B2
(45) Date of Patent: *Jan. 30, 2018

(54) MIXING PADDLE

(71) Applicant: Francis Walters, Orlando, FL (US)

(72) Inventor: Francis Walters, Orlando, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/352,544

(22) Filed: Nov. 15, 2016

(65) Prior Publication Data

US 2017/0347667 A1 Dec. 7, 2017

Related U.S. Application Data

(63) Continuation-in-part of application No. 15/173,610, filed on Jun. 3, 2016, now Pat. No. 9,526,256.

(60) Provisional application No. 62/345,373, filed on Jun. 3, 2016.

(51) Int. Cl.
*B01F 7/00* (2006.01)
*A21C 1/14* (2006.01)

(52) U.S. Cl.
CPC ......... *A21C 1/141* (2013.01); *B01F 7/00041* (2013.01); *B01F 7/00283* (2013.01); *B01F 2215/0011* (2013.01)

(58) Field of Classification Search
CPC ... A47J 43/07; A47J 43/0711; B01F 7/00041; B01F 7/00283; B01F 2215/0011
USPC ............................................ 366/342, 98, 97
See application file for complete search history.

(56) References Cited

U.S. PATENT DOCUMENTS

2012/0081992 A1* 4/2012 Annis .................. A47J 43/0711
366/309

* cited by examiner

*Primary Examiner* — Tony G Soohoo
*Assistant Examiner* — Anshu Bhatia
(74) *Attorney, Agent, or Firm* — Bruce E. Weir

(57) ABSTRACT

A mixing paddle for mixing dough and for cutting and mixing dense ingredients such as butter and shortening into dry ingredients such as flour has roughened cutting blades oriented at many angles. Some blades are attached between a central blade support shaft and a symmetrical rim. The blades may have roughed cutting edges to increase variety in fat chunk size and to improve mixing.

9 Claims, 27 Drawing Sheets

MIXING PADDLE

CROSS-REFERENCES TO RELATED APPLICATIONS

This application claims the benefit of U.S. provisional patent application Ser. No. 62/345,373, filed by the same inventor on Jun. 3, 2016, now pending. This application is a continuation-in-part of U.S. application Ser. No. 15/173,610, filed by the same inventor on Jun. 3, 2016, now pending.

BACKGROUND

Traditionally, a baker mixes pie crust dough by pressing a pastry cutter against the bottom of a mixing bowl to cut butter and shortening into flour and other dry ingredients. The resulting mixture should have roughly pea-sized lumps of fat distributed evenly throughout the dry ingredients. This is usually achieved by repeatedly rotating a parallel-bladed pastry cutter to different positions, pressing the cutter into the ingredients, then briefly stirring the mix. Hand-mixing cold butter into flour with a pastry cutter can be time-consuming and exhausting.

Optimum cutter blade spacing is crucial to obtaining a proper mix. A pastry cutter with blades that are too far apart leaves oversized, poorly distributed lumps. Blades that are too close together tend to clog and create lumps that are too small to produce a flaky crust. Wire cutters mix poorly and often fail to conform to the contours of a mixing bowl. Mixing machines equipped with standard mixing paddles or dough hooks do little more than push ingredients around a mixing bowl.

Some people avoid the difficulties of making pie crust by purchasing pre-made crusts from stores. However, most people prefer fresh pie crust made to a favorite recipe, no matter how tedious and difficult it is to create. A mixing machine attachment that effectively cuts butter and shortening into dry ingredients would ease and simplify creation of homemade pie crust.

SUMMARY

An embodiment of invention is a food mixing machine attachment that allows a user to cut cold butter and shortening into a flour and dry ingredient mixture. Additionally, the attachment can be used to whip cream quickly and to efficiently mix thick batters, cookie doughs, and other hard-to-mix ingredients. The attachment may be compatible with any type of food mixing machine.

DETAILED DESCRIPTION

In the Summary above and in the Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number) (a second number)," this means a range whose lower limit is the first number and whose upper limit is the second number. F or example, 25 to 100 mm means a range whose lower limit is 25 mm, and whose upper limit is 100 mm.

Figure 1:
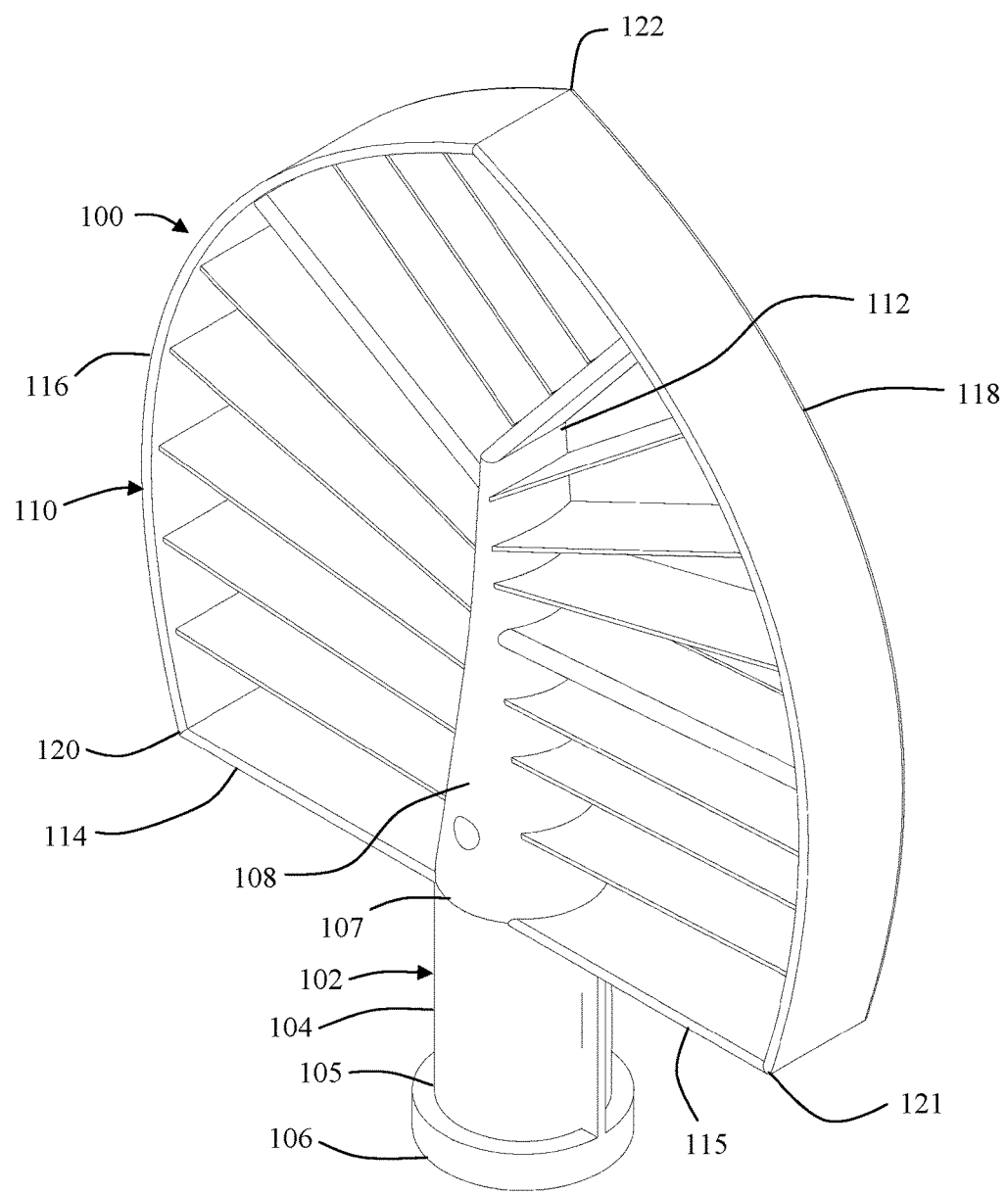
FIG. 1 shows a top right perspective view of an embodiment of the invention.
Figure 2:
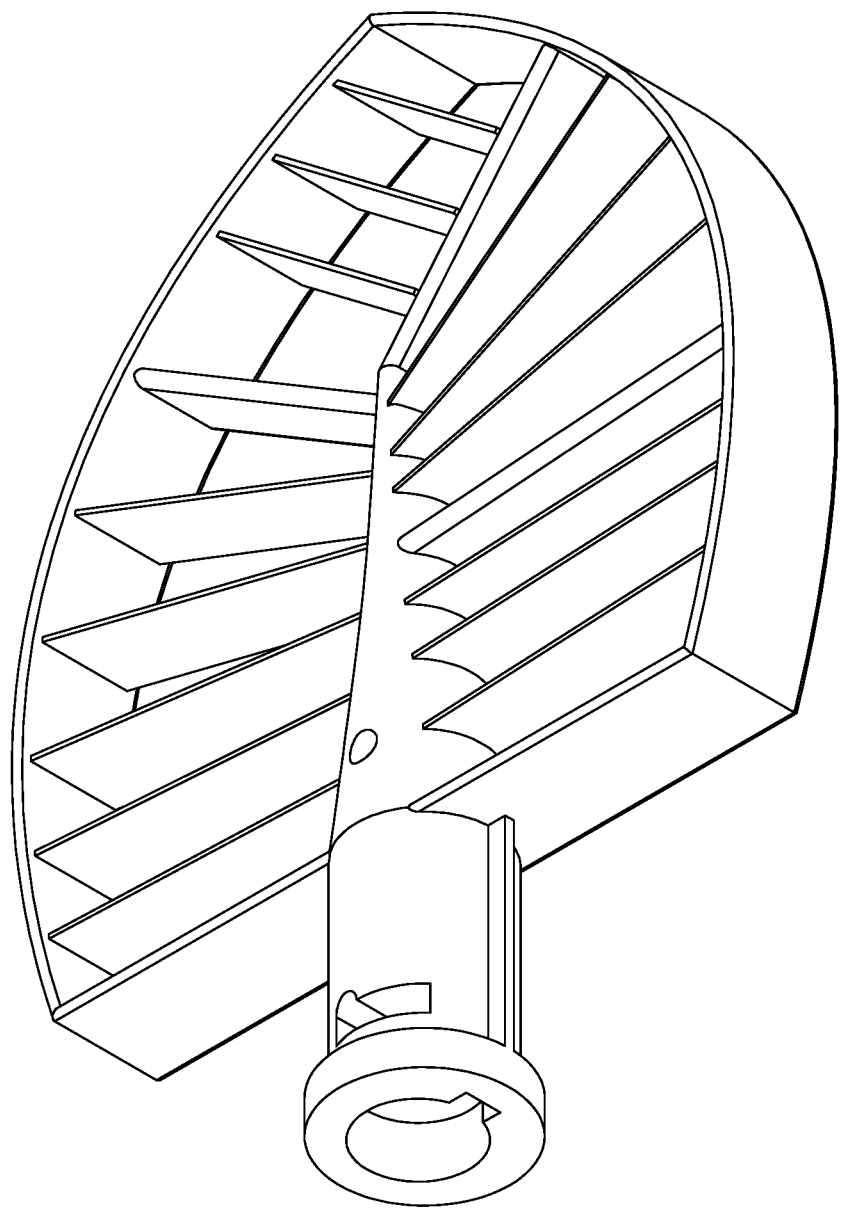
FIG. 2 shows a bottom right perspective view of the embodiment of FIG. 1.
Figure 3:
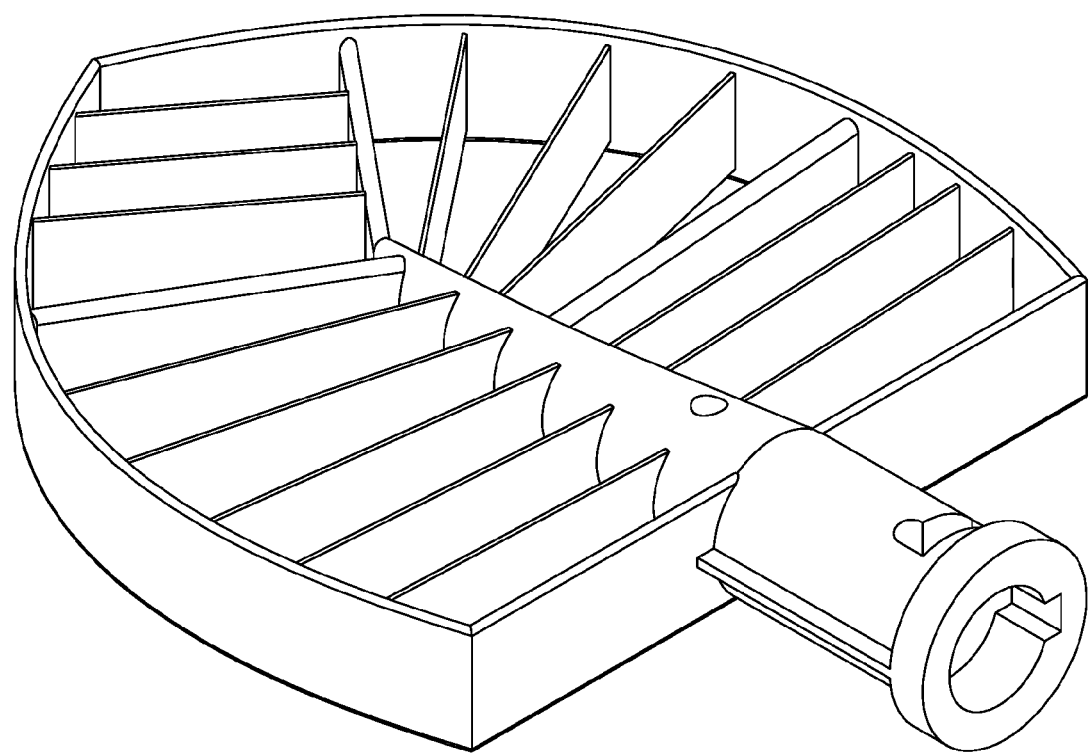
FIG. 3 shows a bottom left perspective view of the embodiment of FIG. 1.
Figure 4:
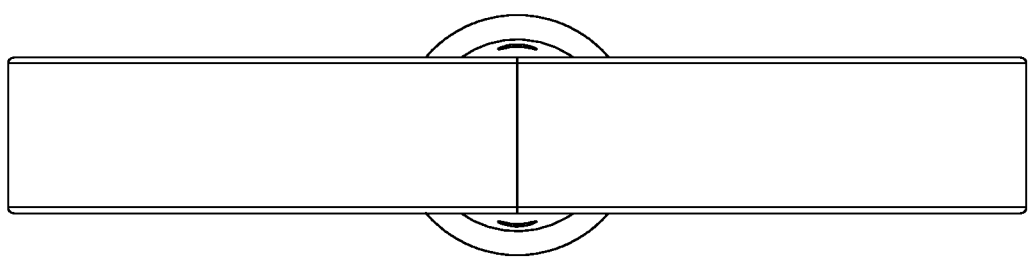
FIG. 4 shows a top plan view of the embodiment of FIG. 1.
Figure 5:
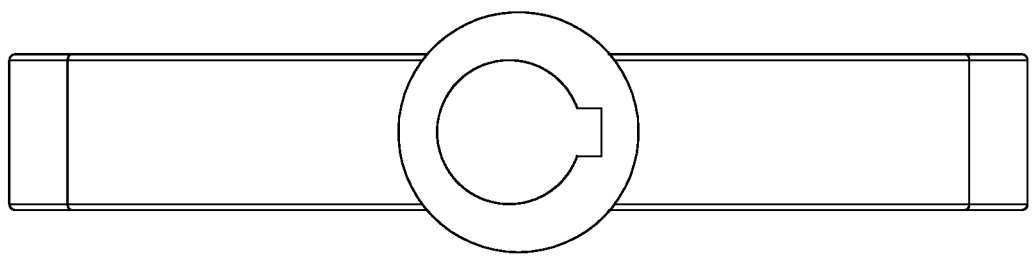
FIG. 5 shows a bottom plan view of the embodiment of FIG. 1.
Figure 6:
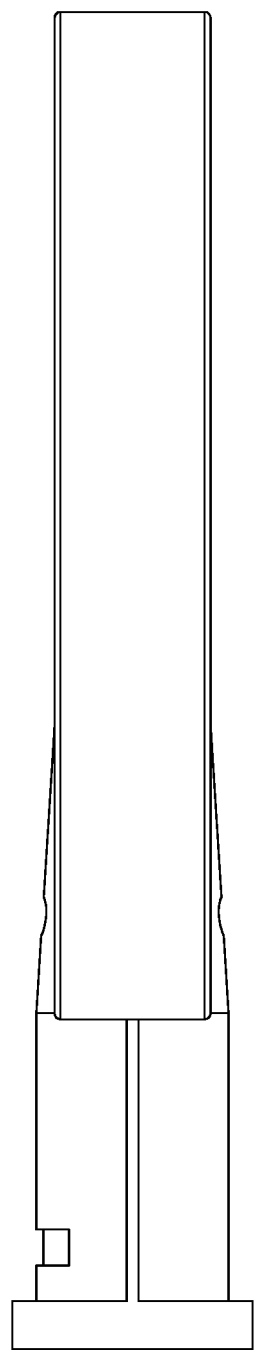
FIG. 6 shows a right elevation view of the embodiment of FIG. 1.
Figure 7:
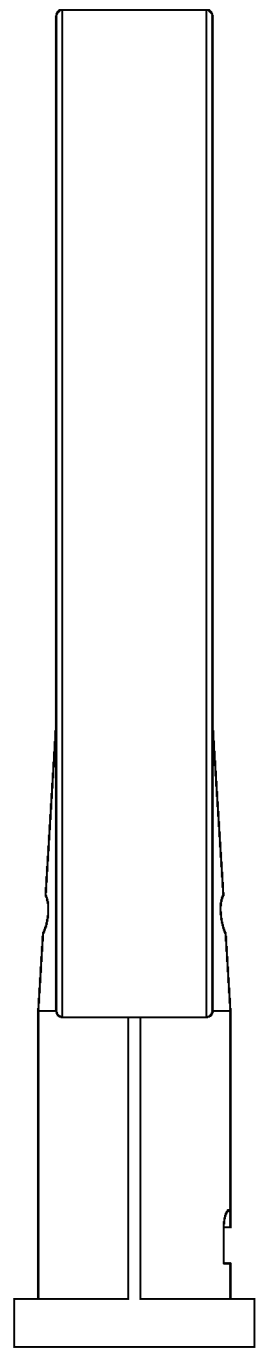
FIG. 7 shows a left elevation view of the embodiment of FIG. 1.
Figure 8:
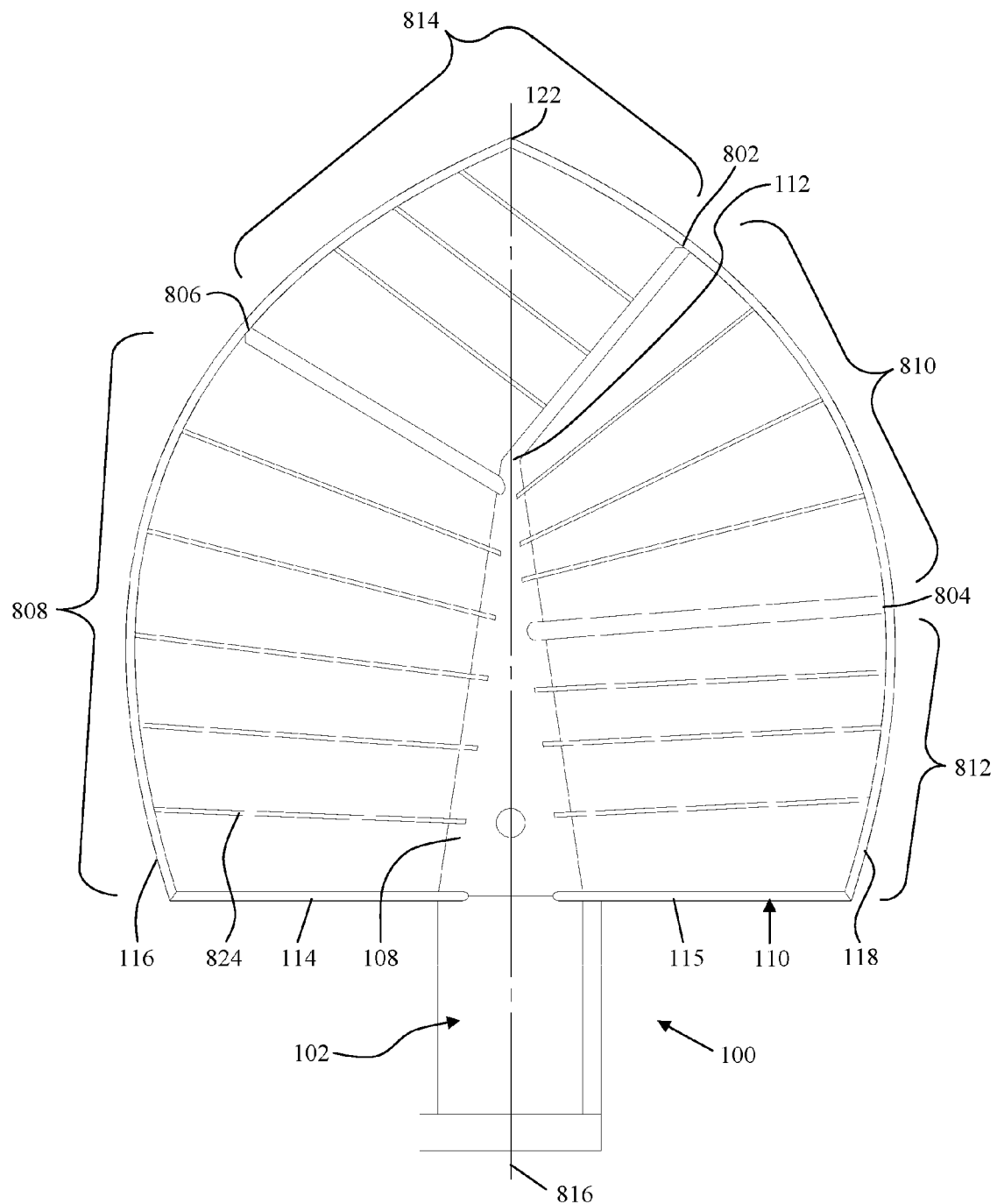
FIG. 8 shows a front elevation view of the embodiment of FIG. 1.
Figure 9:
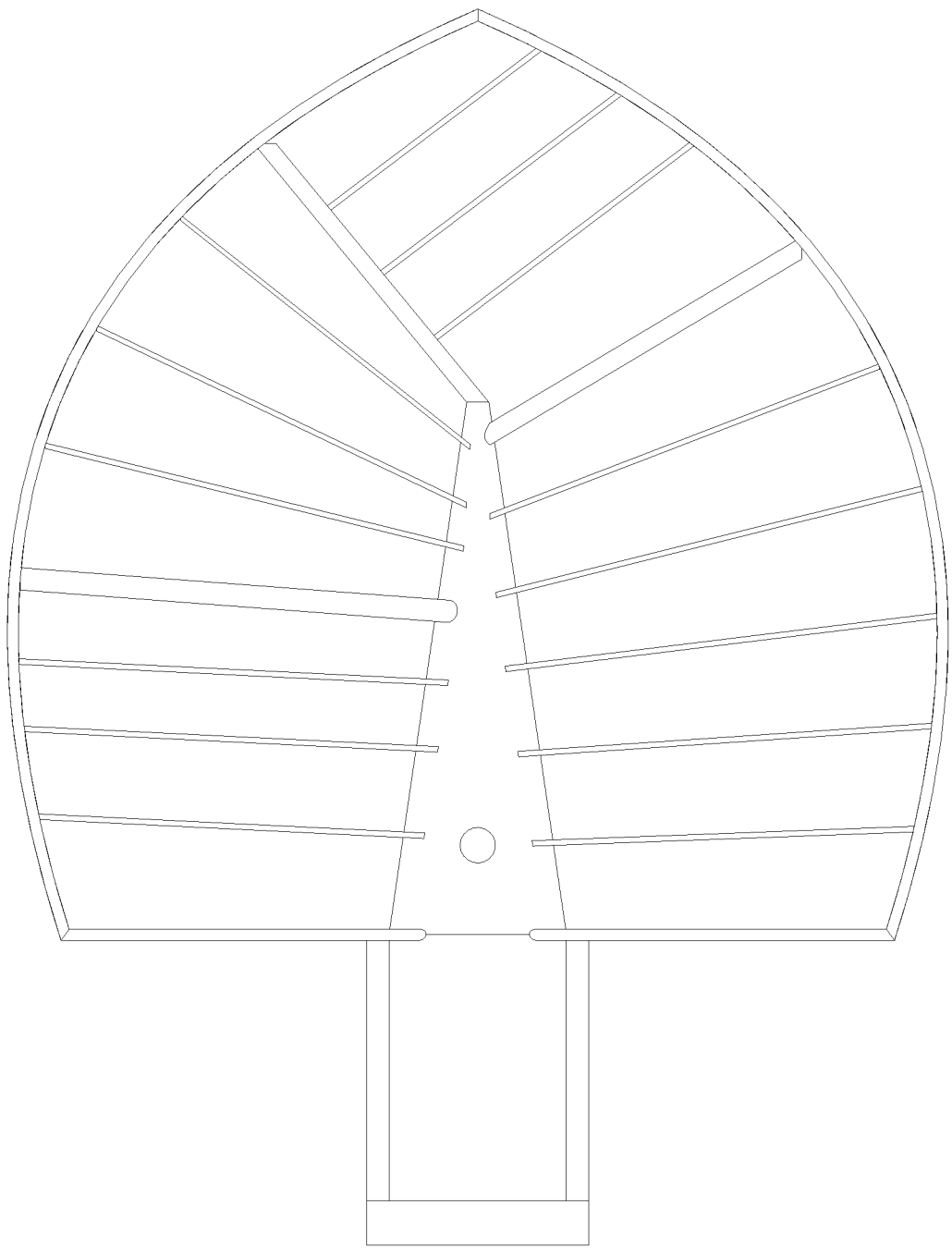
FIG. 9 shows a rear elevation view of the embodiment of FIG. 1.

FIG. 1 shows a top right front perspective view of a mixing paddle 100 that is especially effective for cutting and mixing dense ingredients such as cold butter and shortening into dry and wet ingredients to form pastry dough, cookie dough, thick batter and other non-uniform mixtures. The mixing paddle 100 of FIG. 1 has a central shaft 102 with a cylindrical base member 104 terminated at a first base member end 105 by an attachment member 106. The base members 104 and attachment members 106 shown in FIGS. 1, 8 and 9 represent a generalized form that may in alternate embodiments include holes, splines, flanges and other structures known in the art to be suitable for attaching the mixing paddle 100 to the beater shaft of a stand mixer, or to a hand mixer or other mixing device. FIGS. 2 through 7 show a commonly-used attachment member. Once attached to a mixing device the mixing paddle 100 is rotated by the mixing device through ingredients in a mixing bowl in a manner well-known in the art.

In the embodiment of FIG. 1 the central shaft 102 forms a blade support member 108 by tapering along its length from a second base member end 107 to a blade support member end 112. As the central shaft 102 tapers from the second base member end 107 to the blade support member end 112 the cross-sectional dimensions of the blade support member 108 diminish more rapidly on a first transverse axis than on a second transverse axis that is normal to the first transverse axis, resulting in a blade support member 108 with a cross-section that changes from circular near the second base member end 107 to elliptical or stadium-shaped at the blade support member end 112. In this embodiment the longest cross-section dimension of the blade support member end 112 parallels the second transverse axis.

A scutiform rim 110 partially or completely surrounds the blade support member 108. In alternate embodiments the rim 110 may be a Reuleaux triangle or other shape that at least partially conforms to the inner contours of a mixing bowl. In many embodiments a first straight rim member 114 and a second straight rim member 115 radiate from opposite sides of the base member 104 and are normal to the base member 104. The first straight rim member 114 is symmetrical to the second straight rim member 115.

A first curved rim member 116 arcs from a distal end 120 of the first straight rim member 114 to an apex 122 at which the first straight rim member 114 joins a second curved rim member 118. The second curved rim member 118 arcs from a distal end 121 of the second straight rim member 115 to the apex 122. The first curved rim member 116 is symmetrical to the second curved rim member 118. The apex 122 is aligned with the center of central shaft 102.

In the embodiment of FIG. 1 the straight and curved rim members 114, 115, 116, 118 are thin, flat and wide. The wide dimension of the apex 122 parallels the second transverse axis of the blade support member end 112. Other embodiments of the invention may employ rim members with circular, triangular or other cross-sectional shapes and proportions. The straight and curved rim members 114, 115, 116, 118 are positioned in reflective symmetry with respect to the blade support member 108 so that the curved rim members 116, 118 travel the same path when the mixing paddle 100 rotates about the long central axis 816 of the central shaft 102.

FIG. 8 shows a front elevation view of the embodiment of FIG. 1. In this embodiment the blade support member end 112 is connected to the second curved rim member 118 by a first rim support member 802. While this embodiment also has second 806 and third 804 rim support members, other embodiments may have more or fewer rim support members that connect the blade support member 108 to the rim 110 to maintain the position of the rim 110 with respect to the central shaft 102. In the embodiment of FIG. 8 the first rim support member 802 joins the second curved rim member 118 at an angle between 80 and 110 degrees and is oriented at a 40 degree angle with respect to the long central axis 816.

A plurality of thin blades 824 also span the area between and are connected to the blade support member 108 and the curved rim members 116, 118. In a preferred embodiment each blade is a thin, straight rectangular metal strip with one long edge having a roughened cutting edge. The roughened edge creates fat chunks of varied sizes and with irregular surfaces. In the embodiment of FIG. 8 the blades are spaced between 6 millimeters and 13 millimeters apart to cut fat into small enough chunks to ensure desired fat distribution while minimizing clogs that may occur between tightly-spaced blades. The rim 110 and the central shaft 102 would have reflective symmetry with respect to a bisecting plane that passes through all rim members, contains the long central axis and bisects both the rim 110 and the central shaft 102 into equal halves. The wide dimension of each rectangular blade is the minimum distance between the blade's longest edges. In this embodiment all blades are oriented with their wide dimensions normal to the bisecting plane of the mixing paddle 100.

As the mixing paddle 100 rotates through ingredients the rough-edged blades 824 tend to drag fat chunks along rather than slicing through them cleanly, thereby promoting better mixing. Fat chunks of different sizes that are well-distributed in pastry dough produce flakiness in a baked pie crust.

In the embodiment of FIG. 8 the blades 824 are grouped into four enclosed regions defined by the rim members, rim support members and the blade support member. In alternate embodiments blades may be partially enclosed by rim members and/or may serve as support members. In the embodiment of FIG. 8, the fourth enclosed region 808 is bordered by the blade support member 108, the second rim support member 806, a portion of the first curved rim member 116 and the first straight rim member 114. The second enclosed region 810 is bordered by the blade support member 108, the first rim support member 802, a portion of the second curved rim member 118, and the third rim support member 804. The third enclosed region 812 is bordered by the blade support member 108, the third rim support member 804, a portion of the second curved rim member 118 and the second straight rim member 115. The first enclosed region 814 is bordered by the first rim support member 802, the blade support member end 112, the second rim support member 806, a portion of the first curved rim member 116, the apex 122 and a portion of the second curved rim member 118.

The blades 824 in the second 810, third 812 and fourth 808 enclosed regions are all at proximal ends attached to or integral with the blade support member 108 and are oriented in an approximately radial manner with respect to the blade support member 108. The blades 824 in the fourth enclosed region 808 are all at distal ends attached to or integral with the first curved rim member 116, with the blades 824 intersecting the first curved rim member 116 at angles between 80 and 110 degrees. The blades 824 in the second and third enclosed regions 810, 812 are all at distal ends attached to or integral with the second curved rim member 118, with the blades 824 intersecting the second curved rim member 118 at angles between 80 and 110 degrees.

The blades in the first enclosed region 814 span the distance between the first curved rim member 116 and the first rim support member 802. The blades in the first enclosed region 814 are at a distal end attached to or integral with the first curved rim member 116 and at a proximal end attached to or integral with the first rim support member 802. The blades in the first enclosed region 814 are oriented at angles between 85 and 95 degrees with respect to the first rim support member 802, angles between 80 and 110 degrees with respect to the first curved rim member 116, and angles between 50 and 60 degrees with respect to the long central axis 816. In alternate embodiments the first rim support member 802 may be oriented at angles greater or smaller than 40 degrees with respect to the long central axis 816.

In this embodiment roughened edges on blades within the second 810 and third 812 enclosed regions are on an opposite of the bisecting plane with respect to roughened edges on the blades within the fourth enclosed region 808. Each blade with the first enclosed region 814 may have either or both edges roughened.

When the mixing paddle 100 is rotated about the long axis 816 of the central shaft 102, the blades 824 in the first enclosed region 814 and at least one of blades 824 in the second enclosed region 810 pass through ingredients in a mixing bowl. Since the blades 824 in the second enclosed region 810 and the first rim support member 802 are oriented at angles close to 90 degrees with respect to the blades 824 in the first enclosed region 814, fat chunks and dry ingredients are rapidly cut at different angles.

Additionally, the long axis 816 of the central shaft 102 passes through the blades in the first enclosed region 814. When the mixing paddle 100 is rotated about the long axis 816 of the central shaft 102 the blades in the first enclosed region 814 travel concentric double cone paths, with the joined apices of each pair of conical paths falling between the ends of an individual blade. Portions of each blade 824 in the first enclosed region 814 form different parts of a double cone path while moving in opposite directions. Each blade 824 forms a separate double cone path. Each double cone path is offset from the others. The complex circulation caused by the combined motions of the blades in the first enclosed region 814 results in both rapid cutting and efficient mixing of non-uniform mixtures.

Figure 10:
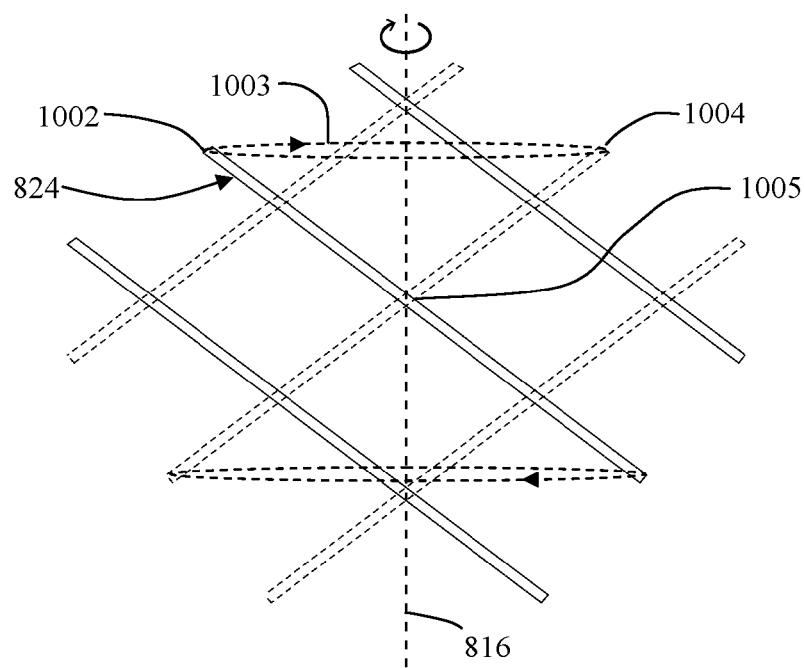
FIG. 10 shows a front elevation view of the blades of the first enclosed region of FIG. 8 isolated from surrounding structure and rotated 180 degrees around the long central axis of the central shaft.
Figure 11:
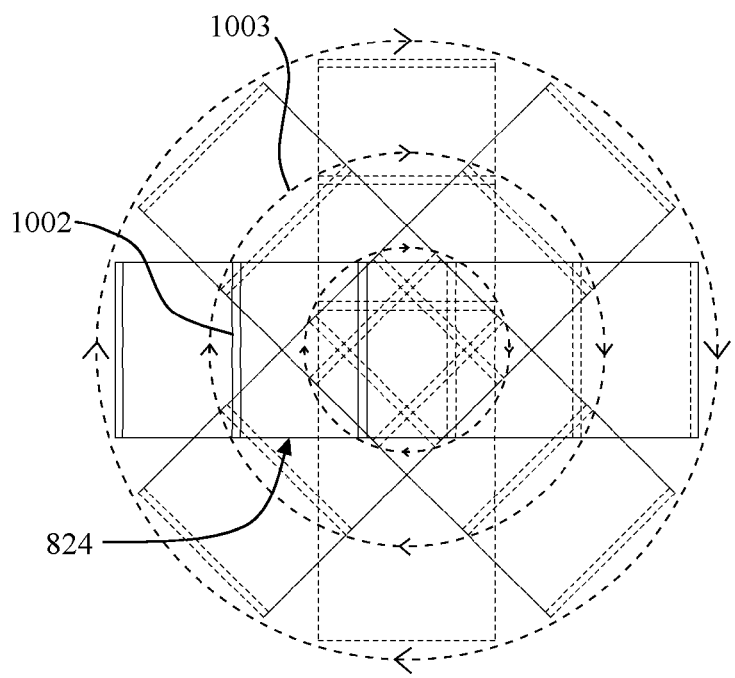
FIG. 11 shows a top plan view of the blades of the first enclosed region of FIG. 8 isolated from surrounding structure and rotated 45, 90 and 135 degrees around the long central axis of the central shaft.

FIGS. 10 and 11 show simplified views of the rotational motion of the blades 824 of the first enclosed region 814 of the embodiment of FIG. 8. FIG. 10 shows the blades 824 of the first enclosed region 814 of the embodiment of FIG. 8 isolated from and without the first rim support member 802, the second rim support member 806, the first curved rim member 116 and the second curved rim member 118. The isolated blades 824 of FIG. 10 are shown in solid lines in a first position 1002, then rotated 180 degrees along a circular path 1003 to a second position 1004. Each end of each blade 824 travels a separate, concentric circular path around the long central axis 816. The circumference of each path is at a minimum where a blade 824 intersects 1005 the long central axis 816. FIG. 11 shows a top plan view of isolated blade 824 rotational paths, with blades 824 rotated 45, 90 and 135 degrees around the long central axis 816 of the central shaft 102. Although the rotational paths shown in FIG. 10 are tilted slightly with respect to the long central axis 816 to better show their circular nature, when the mixing paddle 100 is in use the long central axis 816 is orthogonal to the circles bounded by the rotational paths.

Figure 12:
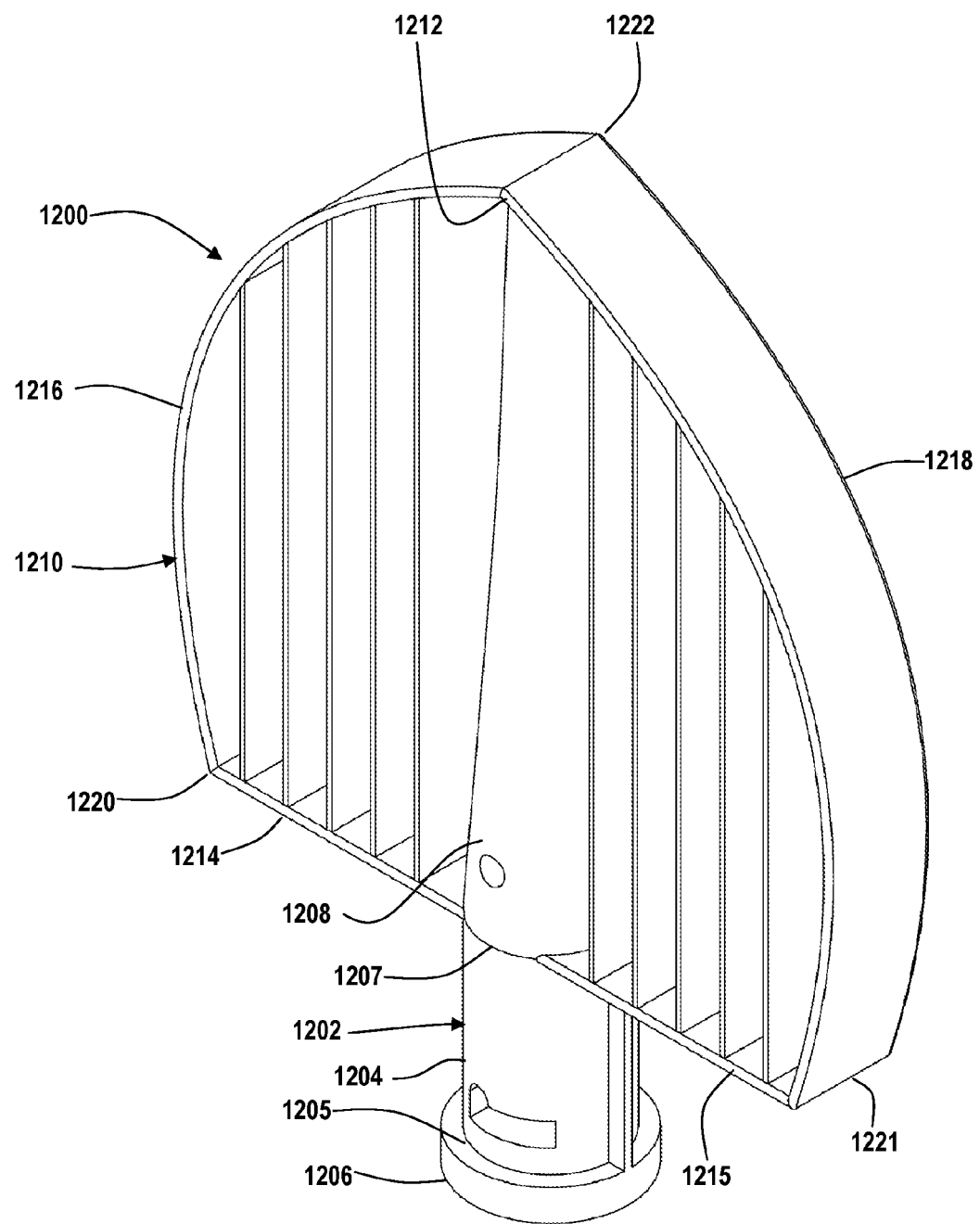
FIG. 12 shows a top right perspective view of an invention embodiment with vertical blades.
Figure 12A:
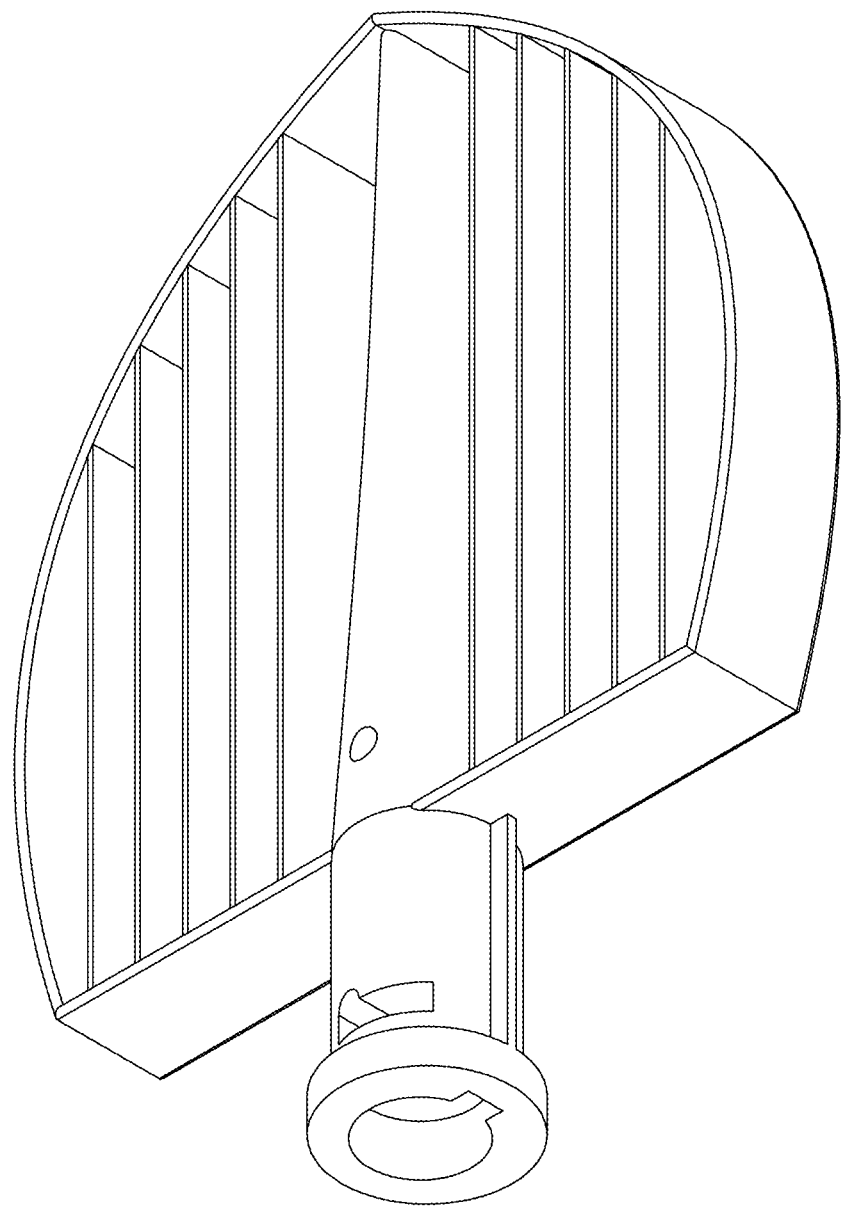
Figure 12B:
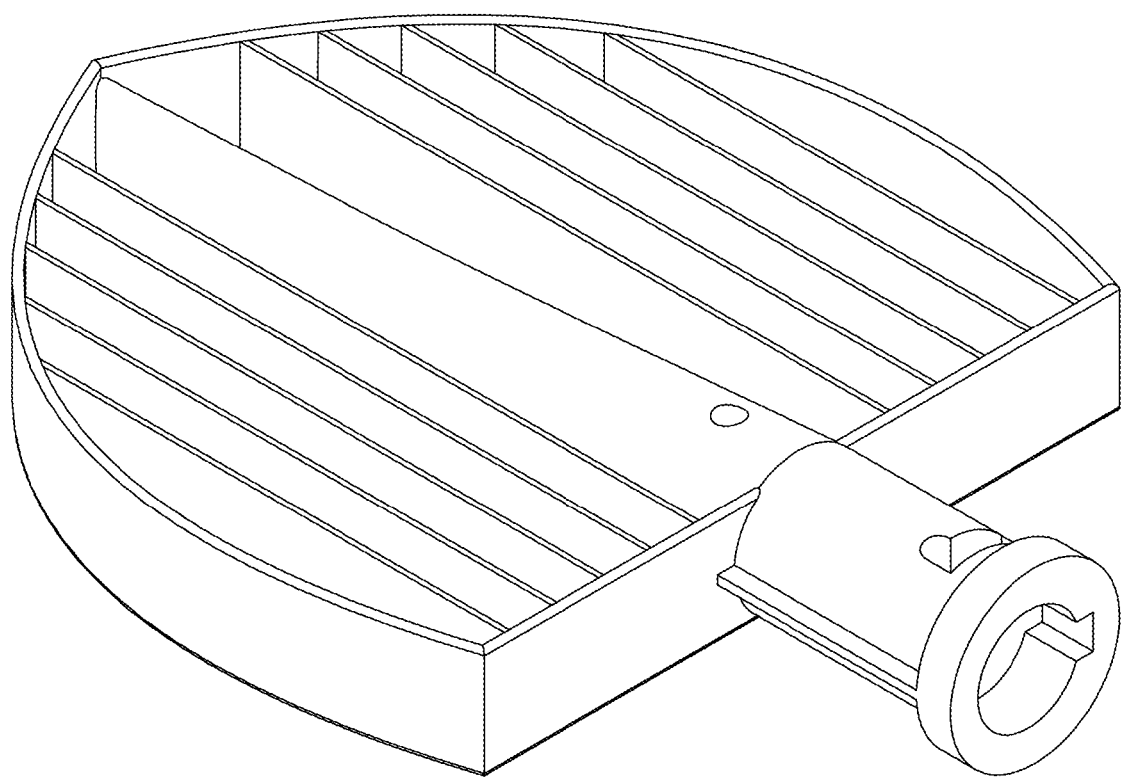
Figure 13:
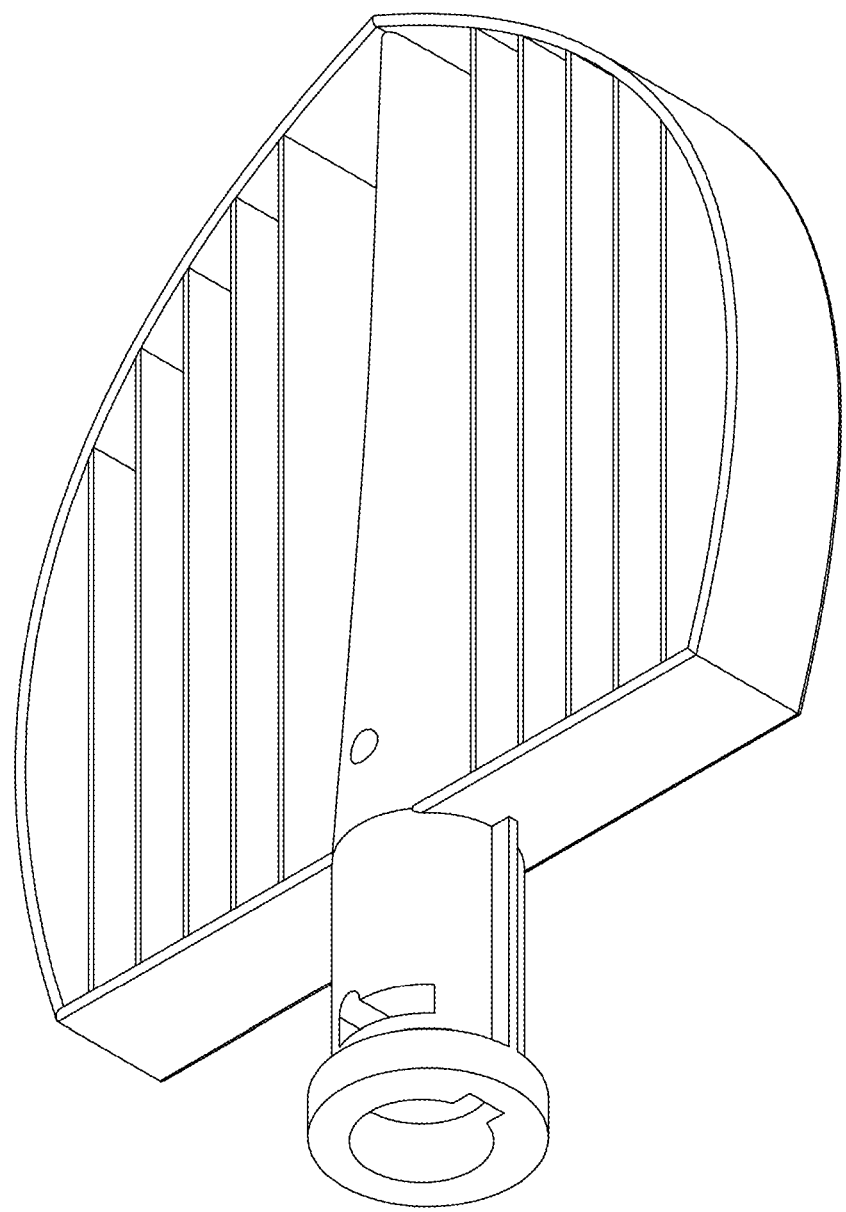
FIG. 13 shows a bottom right perspective view of the embodiment of FIG. 12.
Figure 14:
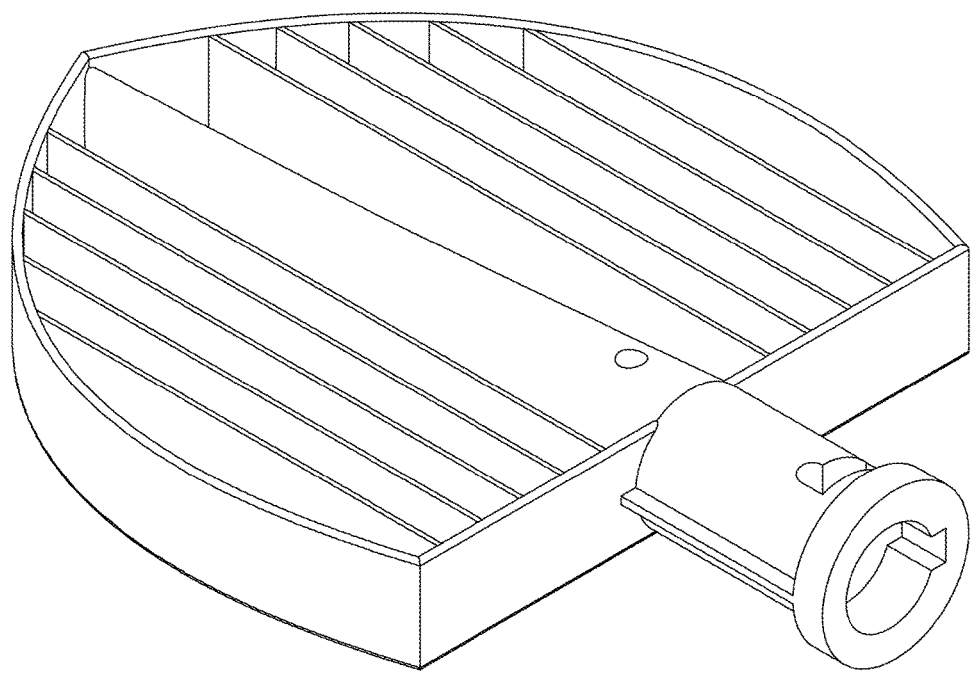
FIG. 14 shows a bottom left perspective view of the embodiment of FIG. 12.
Figure 15:
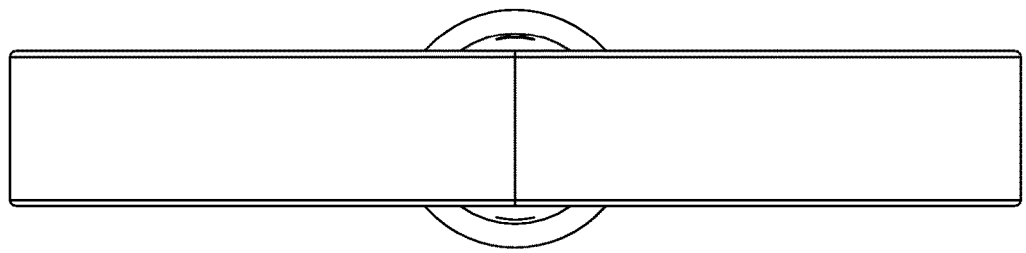
FIG. 15 shows a top plan view of the embodiment of FIG. 12.
Figure 16:
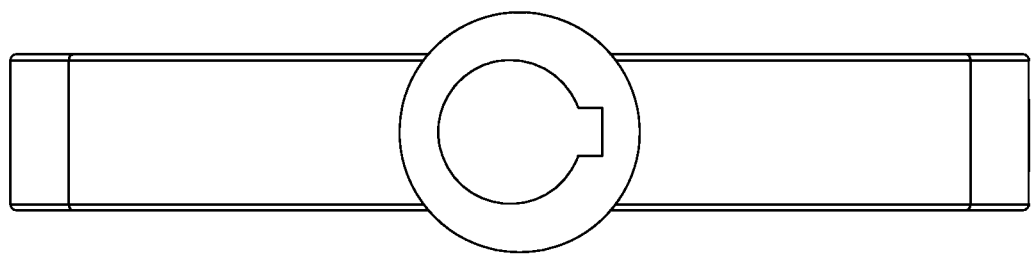
FIG. 16 shows a bottom plan view of the embodiment of FIG. 12.
Figure 17:
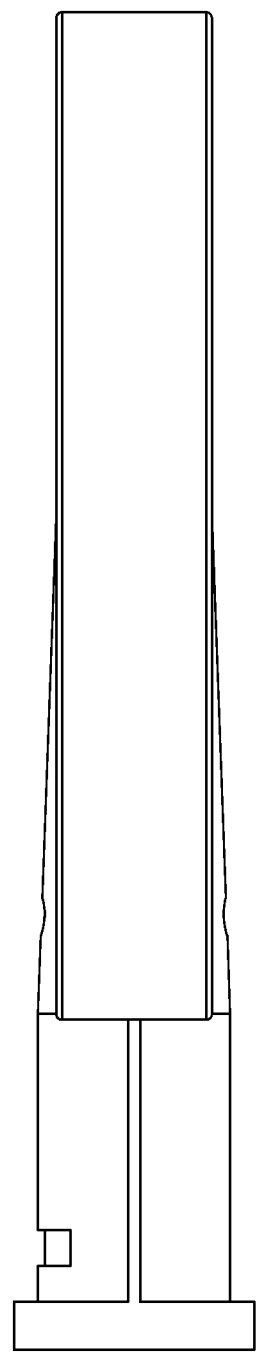
FIG. 17 shows a right elevation view of the embodiment of FIG. 12.
Figure 18:
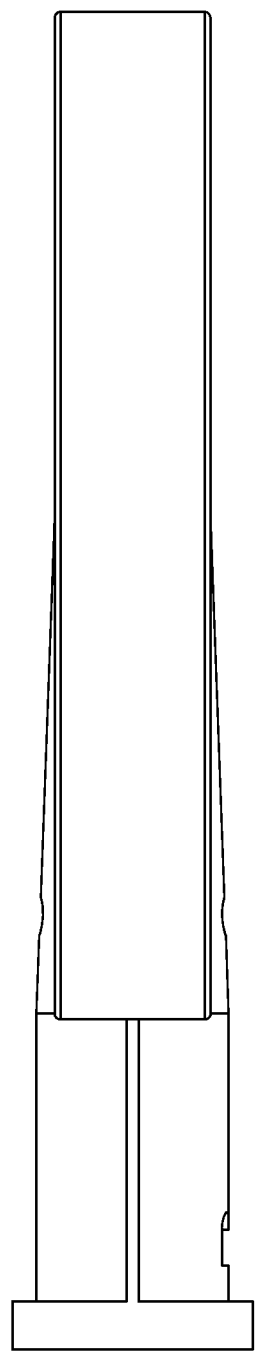
FIG. 18 shows a left elevation view of the embodiment of FIG. 12.

FIG. 12 shows a top right front perspective view of an alternate embodiment of a mixing paddle. The mixing paddle 1200 of FIG. 12 has a central shaft 1202 with a cylindrical base member 1204 terminated at a first base member end 1205 by an attachment member 1206. The base members 1204 and attachment members 1206 shown in FIG. 12 represent a generalized form that may in alternate embodiments include holes, splines, flanges and other structures known in the art to be suitable for attaching the mixing paddle 1200 to the beater shaft of a stand mixer, or to a hand mixer or other mixing device. Once attached to a mixing device the mixing paddle 1200 is rotated by the mixing device through ingredients in a mixing bowl in a manner well-known in the art.

In the embodiment of FIG. 12 the central shaft 1202 forms a rim support member 1208 by tapering along its length from a second base member end 1207 to a rim support member end 1212. As the central shaft tapers 1202 from the second base member end 1207 to the rim support member end 1212 the cross-sectional dimensions of the rim support member 1208 diminish more rapidly on a first transverse axis than on a second transverse axis that is normal to the first transverse axis, resulting in a rim support member 1208 with a cross-section that changes from circular near the second base member end 1207 to elliptical or stadium-shaped at the rim support member end 1012. In this embodiment the longest cross-section dimension of the rim support member 1212 end parallels the second transverse axis.

A scutiform rim 1210 partially or completely surrounds the rim support member 1208. In alternate embodiments the rim 1210 may be a Reuleaux triangle or other shape that at least partially conforms to the inner contours of a mixing bowl. In many embodiments a first straight rim member 1214 and a second straight rim member 1015 radiate from opposite sides of the base member 1204 and are normal to the base member. The first straight rim member 1214 is symmetrical to the second straight rim member 1215.

A first curved rim member 1216 arcs from a distal end 1220 of the first straight rim member 1214 to an apex 1222 at which the first straight rim member 1214 joins a second curved rim member 1218. The second curved rim member 1218 arcs from a distal end 1221 of the second straight rim member 1215 to the apex 1222. The first curved rim member 1216 is symmetrical to the second curved rim member 1218. The apex 1222 is aligned with the center of central shaft 1202.

In the embodiment of FIG. 12 the straight and curved rim members 1214, 1215, 1216, 1218 are thin, flat and wide. The wide dimension of the apex 1222 parallels the second transverse axis of the rim support member end 1212. Other embodiments of the invention may employ rim members with circular, triangular or other cross-sectional shapes and proportions. The straight and curved rim members 1214, 1215, 1216, 1218 are positioned in reflective symmetry with respect to the rim support member 1208 so that the curved rim members 1216, 1218 travel the same path when the mixing paddle 1200 rotates about the long central axis of the central shaft 1202.

Figure 19:
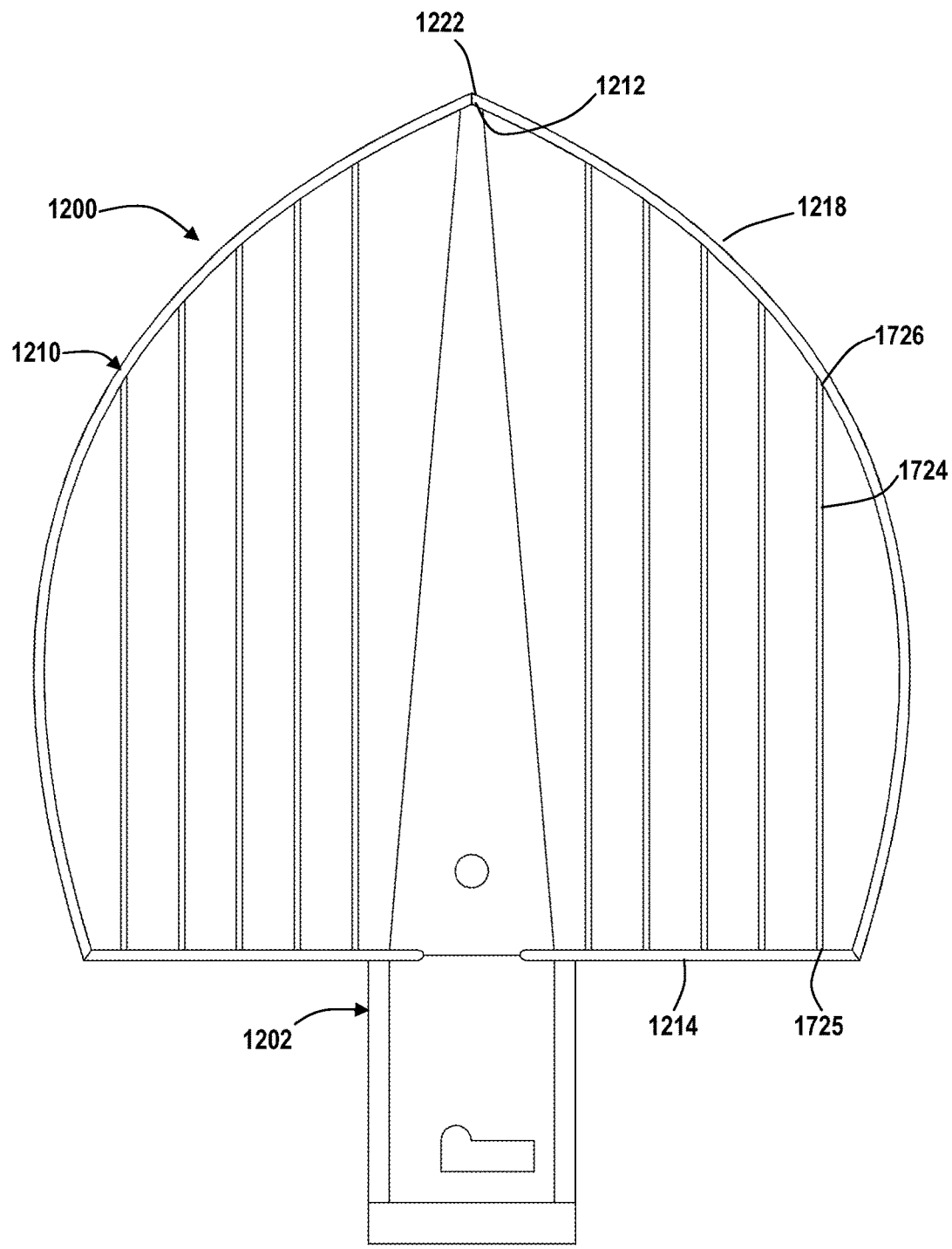
FIG. 19 shows a front elevation view of the embodiment of FIG. 12.
Figure 20:
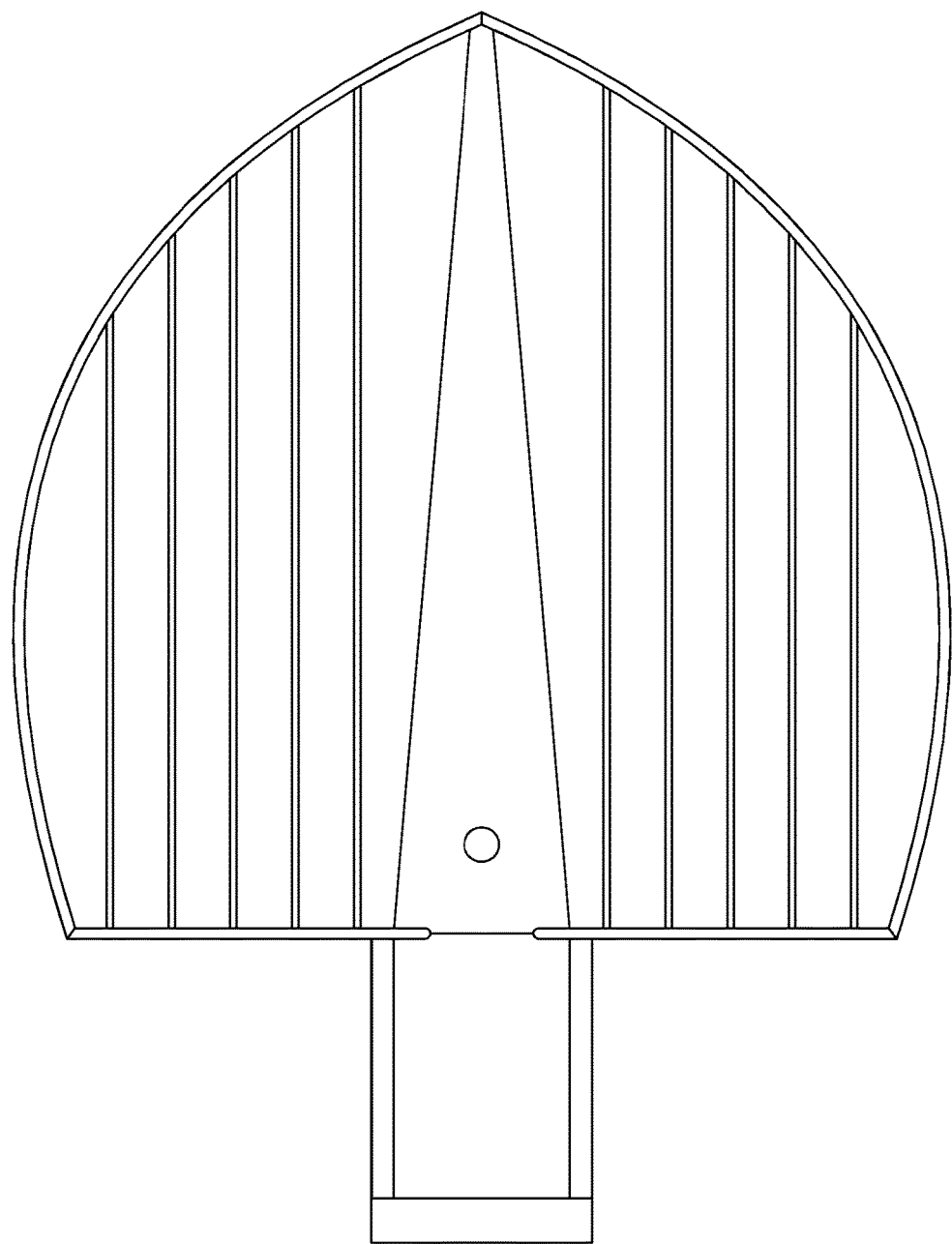
FIG. 20 shows a rear elevation view of the embodiment of FIG. 12.

FIG. 19 shows a front elevation view of the embodiment of FIG. 12. In this embodiment the rim support member end 1212 is connected to the apex 1222. A plurality of thin blades 1724 parallel to the long axis of the central shaft 1202 are attached at bottom ends 1725 to the straight rim members 1214 and at top ends 1726 to curved rim members 1218. In a preferred embodiment each blade is a thin, straight rectangular metal strip with one long edge having a roughened cutting edge. The roughened edge creates fat chunks of varied sizes and with irregular surfaces. In the embodiment of FIG. 19 the blades are spaced between 6 millimeters and 13 millimeters apart to cut fat into small enough chunks to ensure desired fat distribution while minimizing clogs that may occur between tightly-spaced blades. The rim 1210 and the central shaft 1202 would have reflective symmetry with respect to a bisecting plane that passes through all rim members 1210, contains the long central axis and bisects both the rim 1210 and the central shaft 1202 into equal halves. The wide dimension of each rectangular blade is the minimum distance between the blade's longest edges. In this embodiment all blades are oriented with their wide dimensions normal to the bisecting plane of the mixing paddle 1200.

Figure 21:
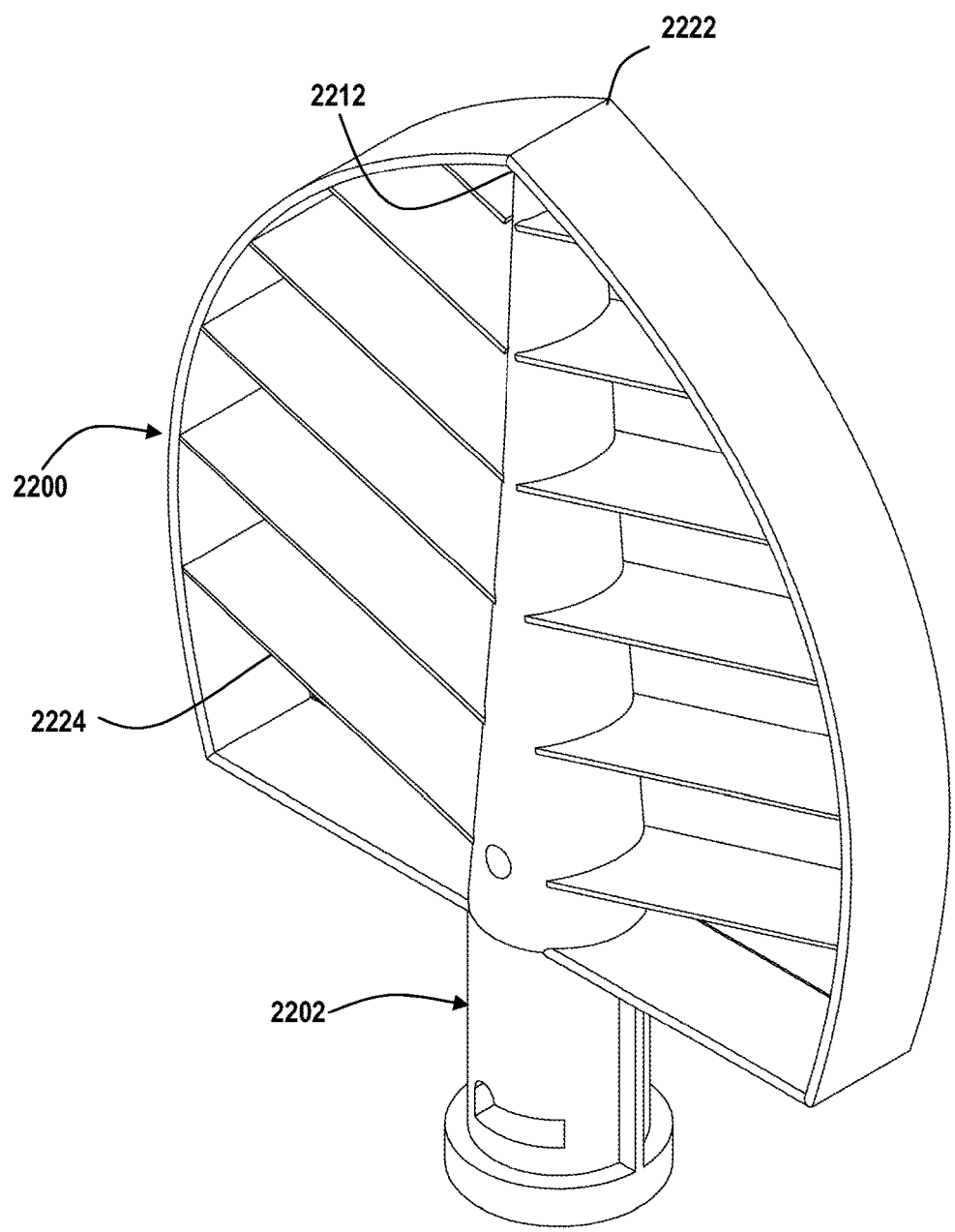
FIG. 21 shows a top right front perspective view of an invention embodiment with horizontal blades.
Figure 22:
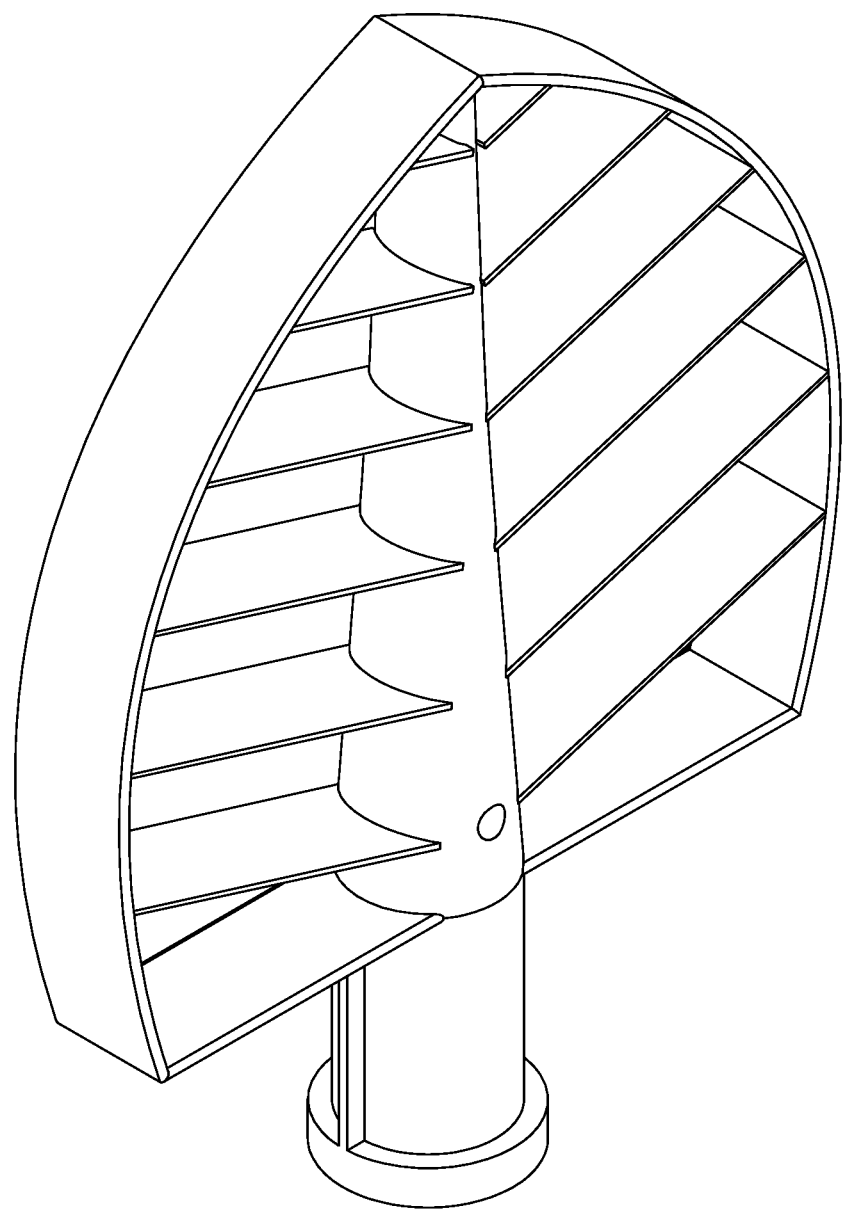
FIG. 22 shows a top right rear perspective view of the embodiment of FIG. 21.
Figure 23:
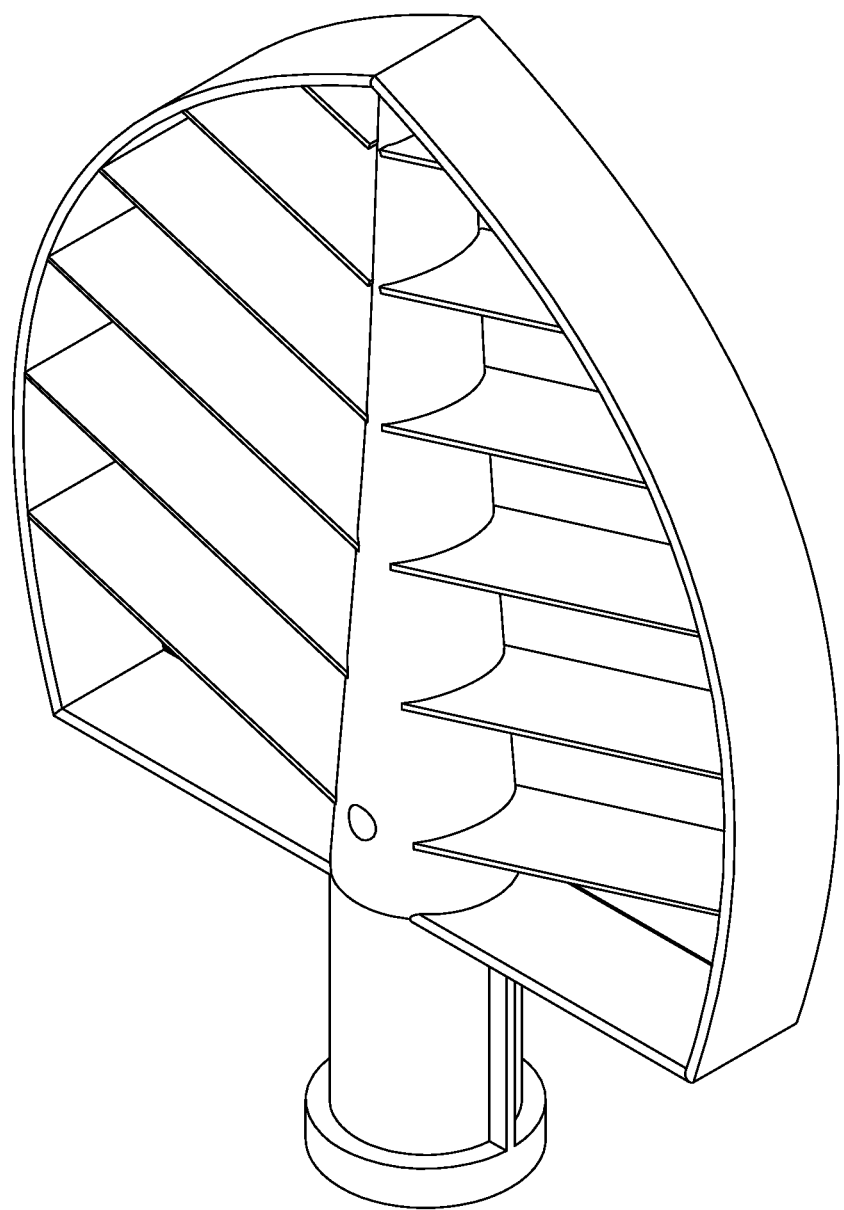
FIG. 23 shows a top left rear perspective view of the embodiment of FIG. 21.
Figure 24:
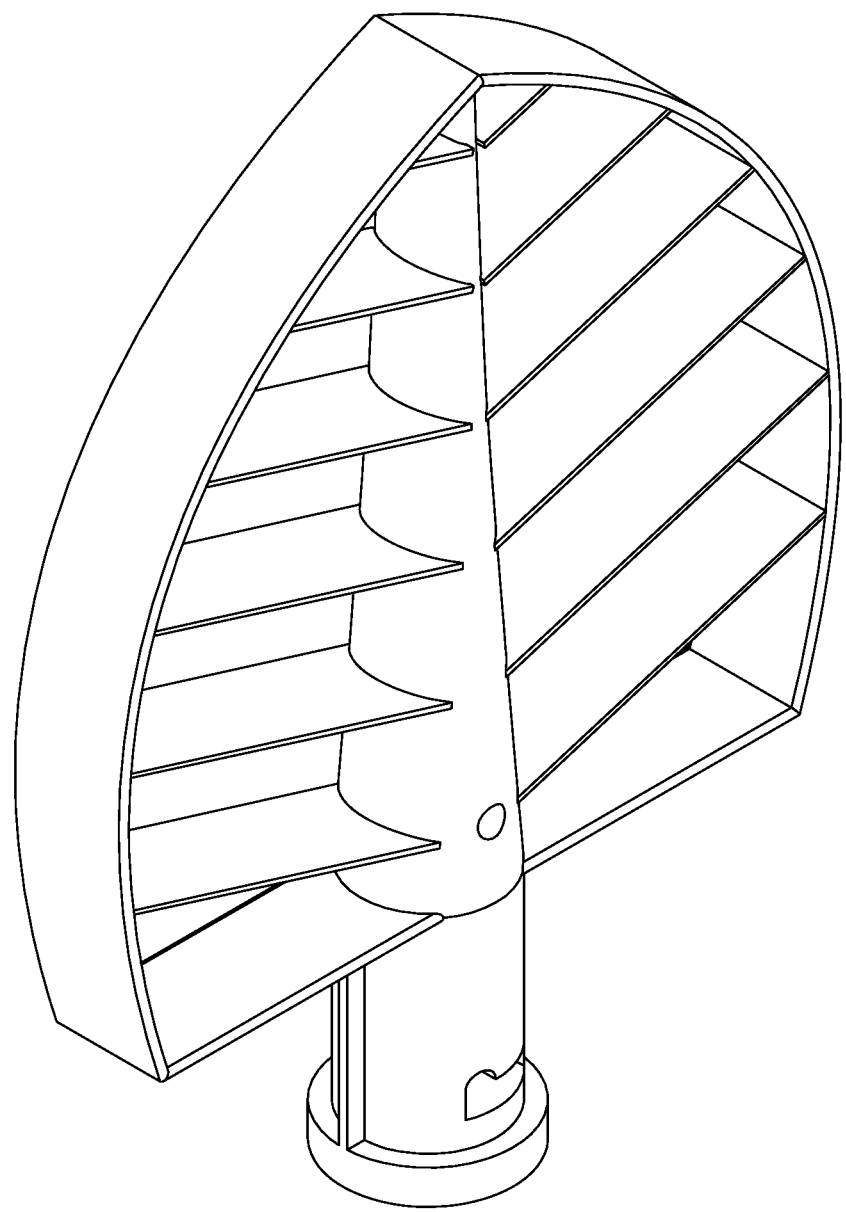
FIG. 24 shows a top left front perspective view of the embodiment of FIG. 21.
Figure 25:
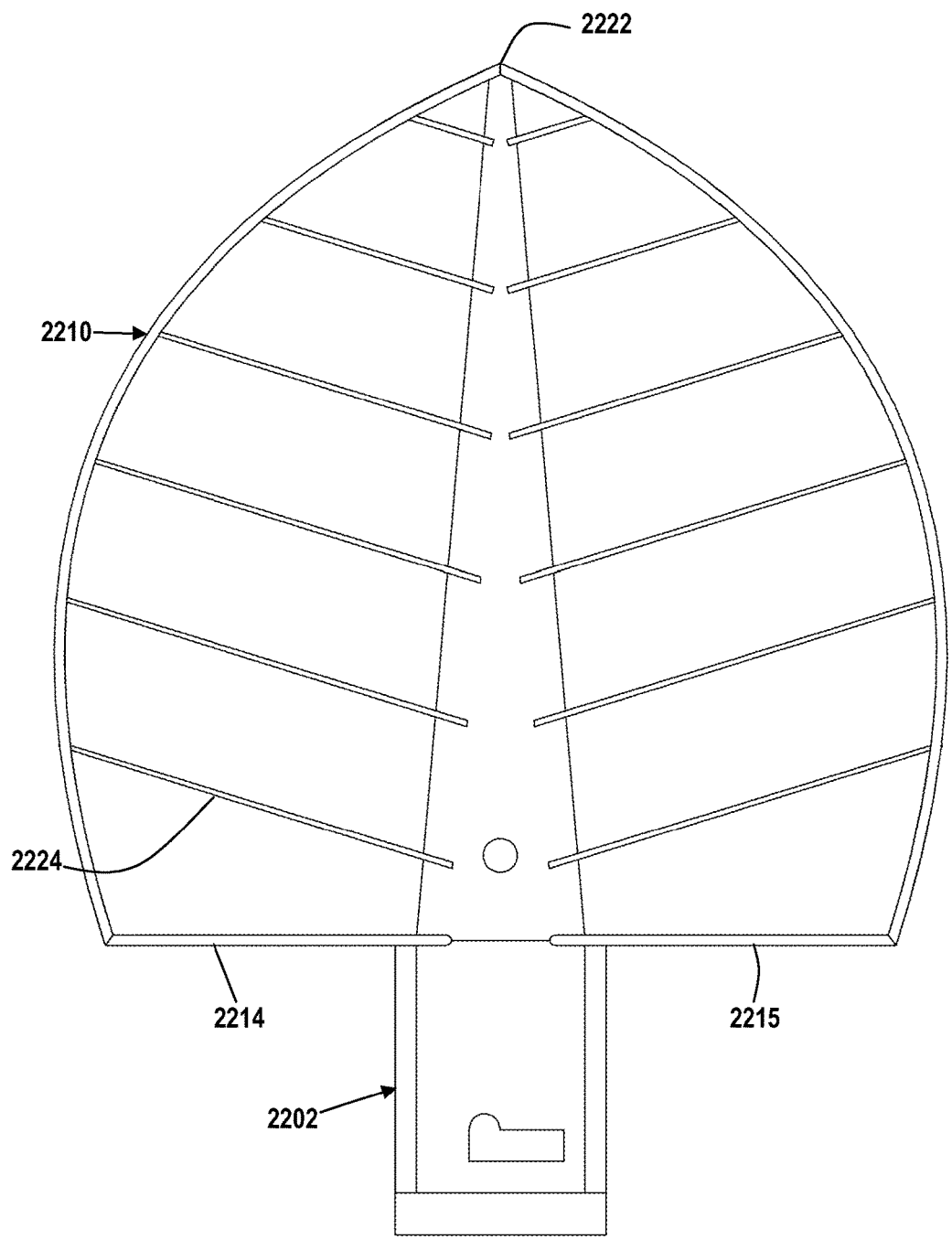
FIG. 25 shows a front elevation view of the embodiment of FIG. 21.
Figure 26:
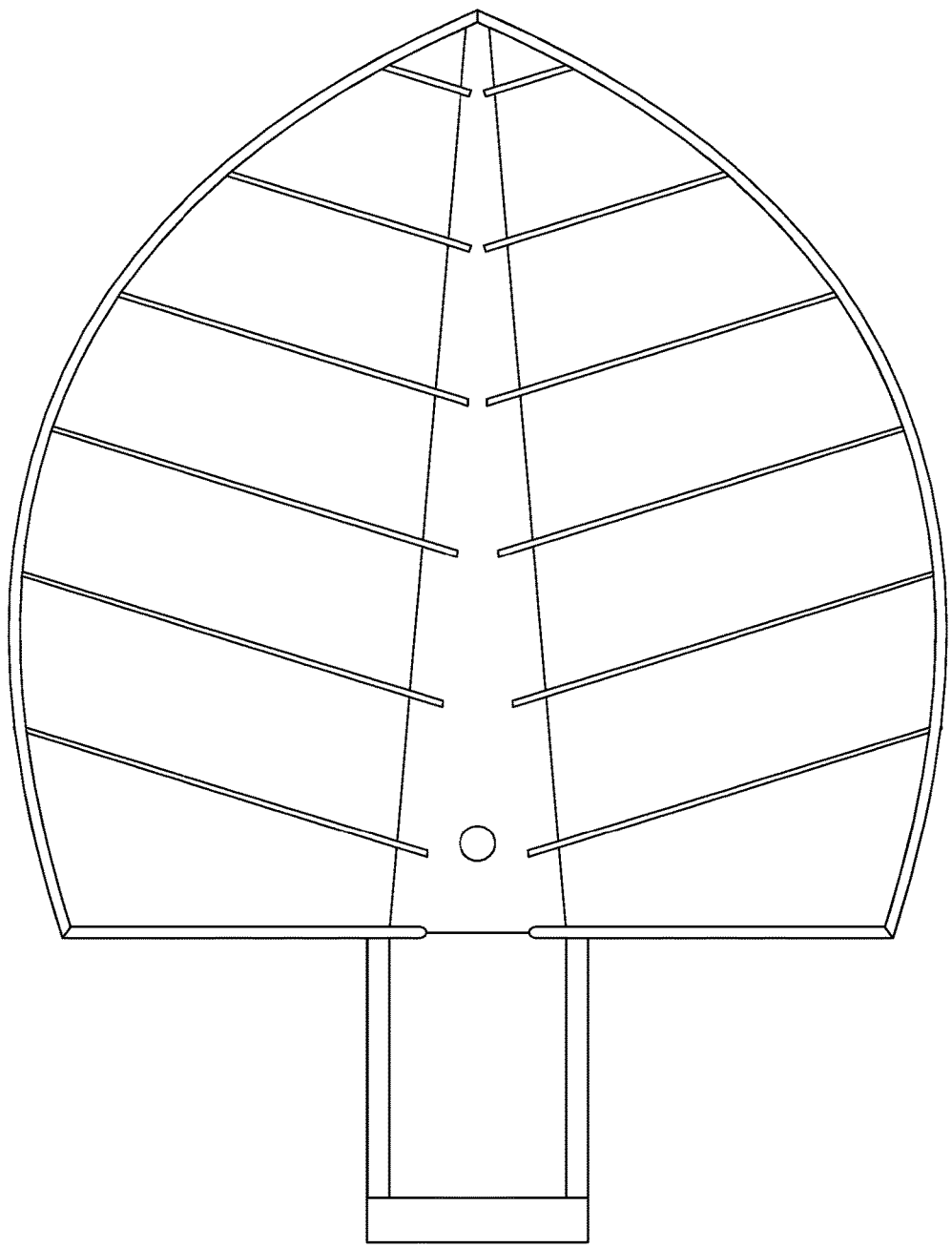
FIG. 26 shows a rear elevation view of the embodiment of FIG. 21.

FIG. 21 shows a top right front elevation view of an alternate embodiment with blades 2224 radiating from the central shaft 2202. In this embodiment the blade support member end 2212 is also connected to the apex 2222. As shown in FIG. 25, a plurality of thin blades 2224 radiate from the central shaft 2202 while angling upward (towards the apex 2222) at angles between 10 and 20 degrees with respect to the straight rim members 2214, 2215. Other embodiments may have blades that are parallel to the straight rim members.

In this embodiment each blade is a thin, straight rectangular metal strip with one long edge having a roughened cutting edge. The roughened edge creates fat chunks of varied sizes and with irregular surfaces. In the embodiment of FIG. 25 the blades are spaced far enough apart to cut fat into small enough chunks to ensure desired fat distribution while minimizing clogs that may occur between tightly-spaced blades.

The rim 2210 and the central shaft 2202 would have reflective symmetry with respect to a bisecting plane that passes through all rim members 2210, contains the long central axis, and bisects both the rim 2210 and the central shaft 2202 into equal halves. The wide dimension of each rectangular blade is the minimum distance between the blade's longest edges. In this embodiment all blades are oriented with their wide dimensions normal to the bisecting plane of the mixing paddle 2200.

As the various mixing paddle embodiments rotate through ingredients the rough-edged blades tend to drag fat chunks along rather than slicing through them cleanly, thereby promoting better mixing. Fat chunks of different sizes that are well-distributed in pastry dough produce flakiness in a baked pie crust. Properly-spaced blade arrays also chop and distribute fruit and other soft ingredients intended to remain in discrete chunks, whereas known mixing paddles tend to either mash such ingredients or leave them in excessively large chunks.

Embodiments of the invention may be manufactured from materials such as but not limited to stainless steel, cast iron, aluminum, ceramics and plastics by casting, machining, welding, 3-D printing and other techniques well-known in the art. The mixing paddle may then be used with stand mixers, hand mixers and other mixing apparatus known in the art.

In an alternate embodiment of the invention a scraper may be attached to one of more rim members to remove and collect ingredients from inner sides of a mixing bowl when the mixing paddle rotates. The scraper can be made of materials such as but not limited to metal, plastic and rubber. The scraper can be thinner or thicker than the rim members with the same shape as the curved rim members.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

I claim:

1. A mixing paddle, comprising:
a central shaft, the central shaft having a long central axis, an attachment member and a blade support member, the attachment member operable to attach the mixing paddle to a mixing device beater shaft;
a rim, the rim including at least a first curved rim member and a second curved rim member, the first curved rim member joined to the second curved rim member at an apex, the first curved rim member reflectively symmetrical to the second curved rim member, the long central axis intersecting the apex, the first curved rim member and the second curved rim member at least partially surrounding the blade support member and disposed symmetrically with respect to the blade support member, the second curved rim member joined to the blade support member by at least a first rim support member; and
a plurality of blades, at least a first blade and a second blade attached at proximal ends to the first rim support member, the first blade and second blade attached at distal ends to the first curved rim member, at least a third blade attached at a proximal end to the blade support member and at a distal end to the second curved rim member.

2. A mixing paddle as claimed in claim 1, wherein the blades are roughened on at least one edge.

3. A mixing paddle, comprising:
a central shaft, the central shaft having a long central axis, an attachment member and a rim support member, the attachment member operable to attach the mixing paddle to a mixing device beater shaft;
a rim, the rim including at least a first curved rim member, a second curved rim member, a first straight rim member, and a second straight rim member, a proximal end of the first curved rim member joined to a proximal end of the second curved rim member at an apex, a proximal end of the rim support member joined to the apex, a distal end of the first curved rim member joined to a distal end of the first straight rim member, a distal end of the second curved rim member joined to a distal end of the second curved rim member, a proximal end of the first straight rim member joined to the rim support member, a proximal end of the second straight rim member joined to the rim support member, the first curved rim member reflectively symmetrical to the second curved rim member, the long central axis intersecting the apex, the first curved rim member and the second curved rim member at least partially surrounding the rim support member and disposed symmetrically with respect to the rim support member; and at least a first blade, the first blade parallel to the rim support member and having a first bottom end and a first top end, the first top end of the first blade attached to the first curved rim member, the first bottom end of the first blade attached to the first straight rim member.

4. A mixing paddle as claimed in claim 3, wherein the first blade is roughened on at least one edge.

5. A mixing paddle as claimed in claim 3, further comprising at least a second blade, the second blade parallel to the rim support member and having a second bottom end and a second top end, the second top end of the second blade attached to the first curved rim member, the second bottom end of the first blade attached to the first straight rim member.

6. A mixing paddle as claimed in claim 3, further comprising at least a second blade, the second blade parallel to the rim support member and having a second bottom end and a second top end, the second top end of the second blade attached to the first curved rim member, the second bottom end of the first blade attached to the first straight rim member, the first and second blades separated by a distance between 6 and 13 millimeters.

7. A mixing paddle as claimed in claim 3, further comprising at least a second blade, the second blade parallel to the rim support member and having a second bottom end and a second top end, the second top end of the second blade attached to the second curved rim member, the second bottom end of the first blade attached to the second straight rim member.

8. A mixing paddle, comprising:
a central shaft, the central shaft having a long central axis, an attachment member and a rim support member, the attachment member operable to attach the mixing paddle to a mixing device beater shaft;

a rim, the rim including at least a first curved rim member, a second curved rim member, a first straight rim member, and a second straight rim member, a proximal end of the first curved rim member joined to a proximal end of the second curved rim member at an apex, a proximal end of the rim support member joined to the apex, a distal end of the first curved rim member joined to a distal end of the first straight rim member, a distal end of the second curved rim member joined to a distal end of the second straight rim member, a proximal end of the first straight rim member joined to the rim support member, a proximal end of the second straight rim member joined to the rim support member, the first curved rim member reflectively symmetrical to the second curved rim member, the long central axis intersecting the apex, the first curved rim member and the second curved rim member at least partially surrounding the rim support member and disposed symmetrically with respect to the rim support member; and a plurality of blades, at least a first blade having a first proximal end and a first distal end, the first proximal end of the first blade attached to the rim support member, the first distal end of the first blade attached to the first curved rim member, and at least a second blade having a second proximal end and a second distal end, the second proximal end of the second blade attached to the rim support member, the second distal end of the second blade attached to the second curved rim member.

9. A mixing paddle as claimed in claim 8, wherein the blades are roughened on at least one edge.

* * * * *